No. 825,866. PATENTED JULY 10, 1906.
L. H. ROGERS.
TANDEM BRAKE CYLINDER.
APPLICATION FILED JUNE 29, 1905.

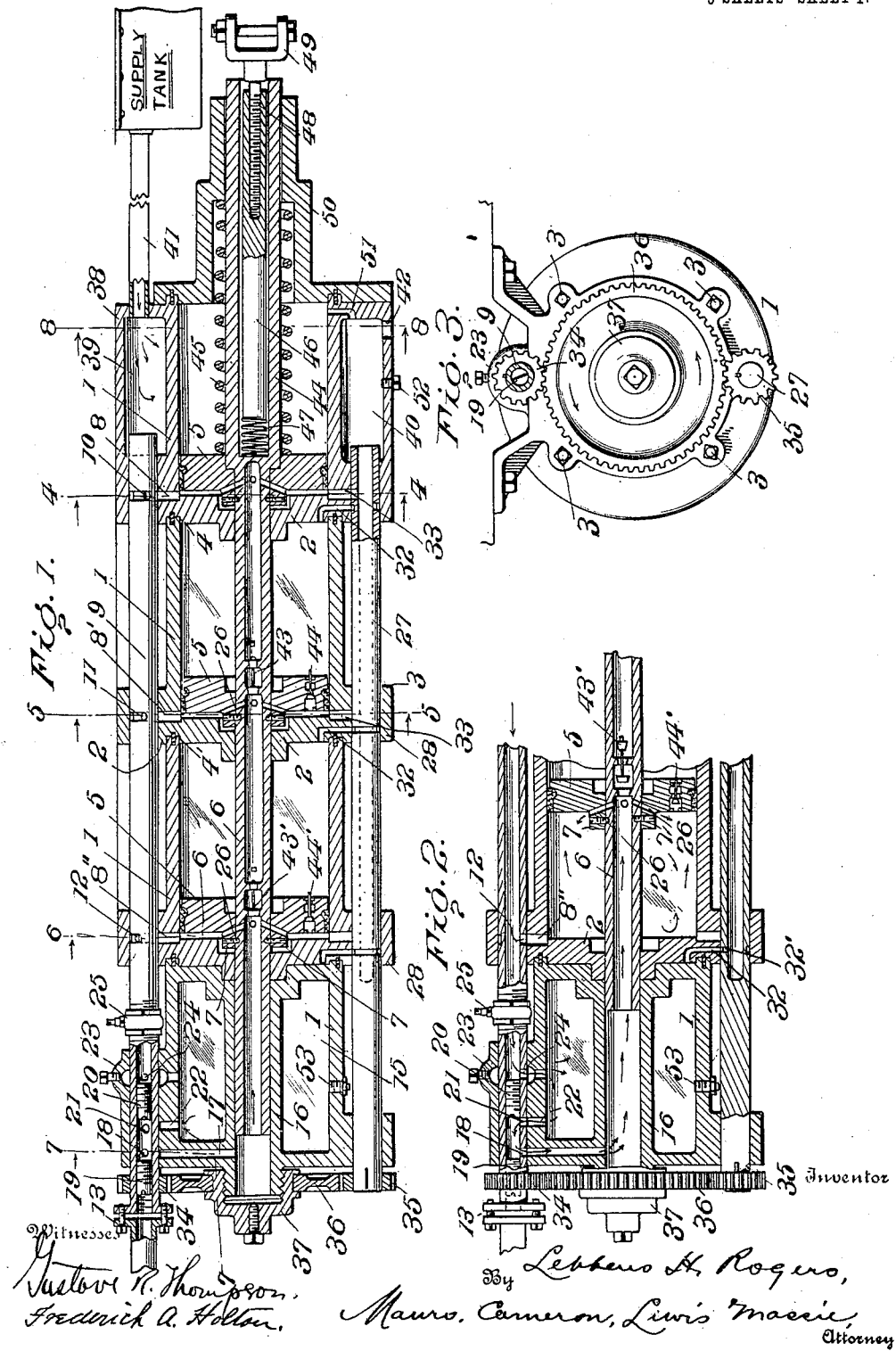

5 SHEETS—SHEET 2.

Witnesses
Gustave R. Thompson
Frederick A. Hollen

Inventor
Lebbeus H. Rogers,
By Mauro, Cameron, Lewis Massie
Attorneys

No. 825,866. PATENTED JULY 10, 1906.
L. H. ROGERS.
TANDEM BRAKE CYLINDER.
APPLICATION FILED JUNE 29, 1905.
5 SHEETS—SHEET 3.
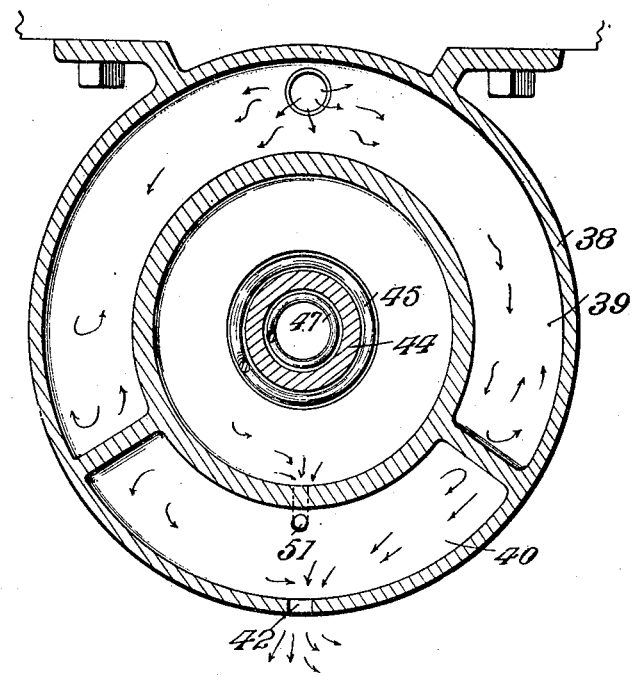
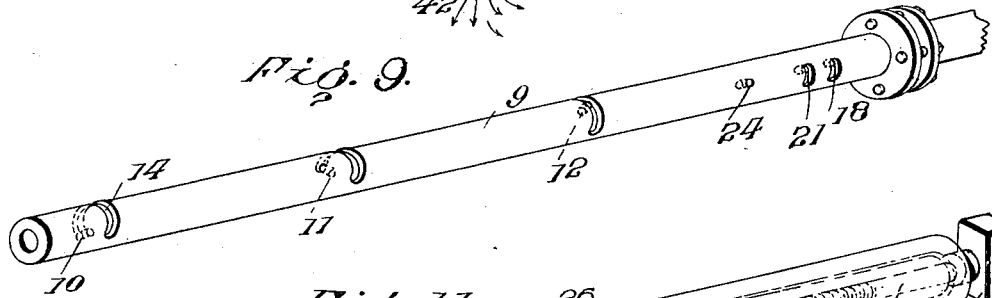
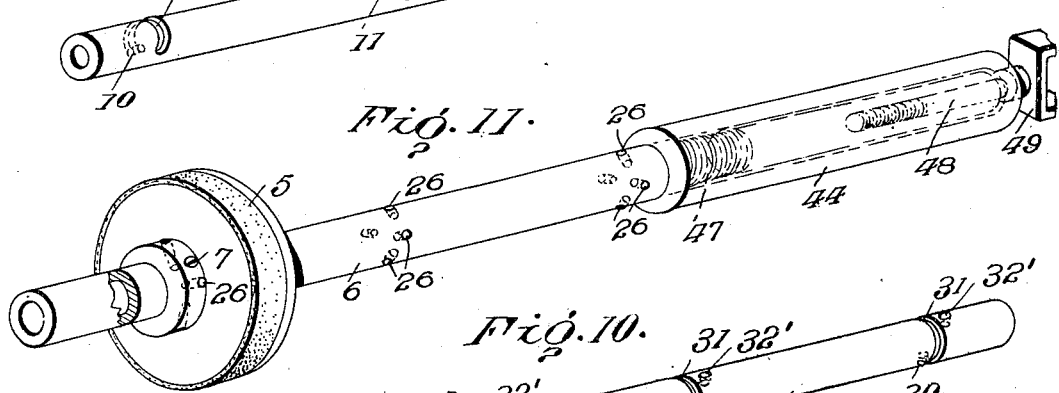
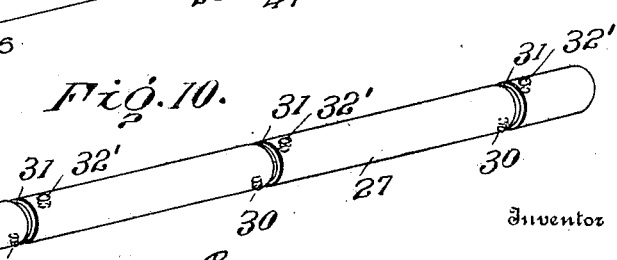

No. 825,866. PATENTED JULY 10, 1906.
L. H. ROGERS.
TANDEM BRAKE CYLINDER.
APPLICATION FILED JUNE 29, 1905.
5 SHEETS—SHEET 4.
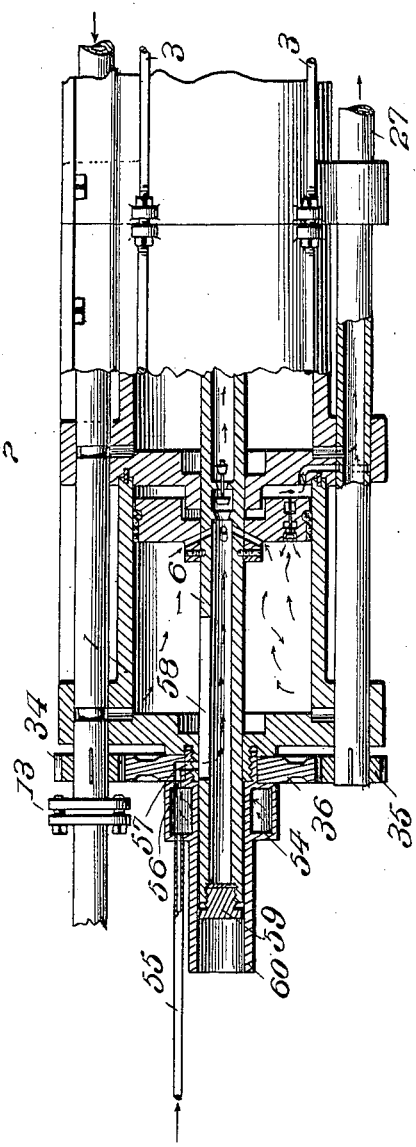
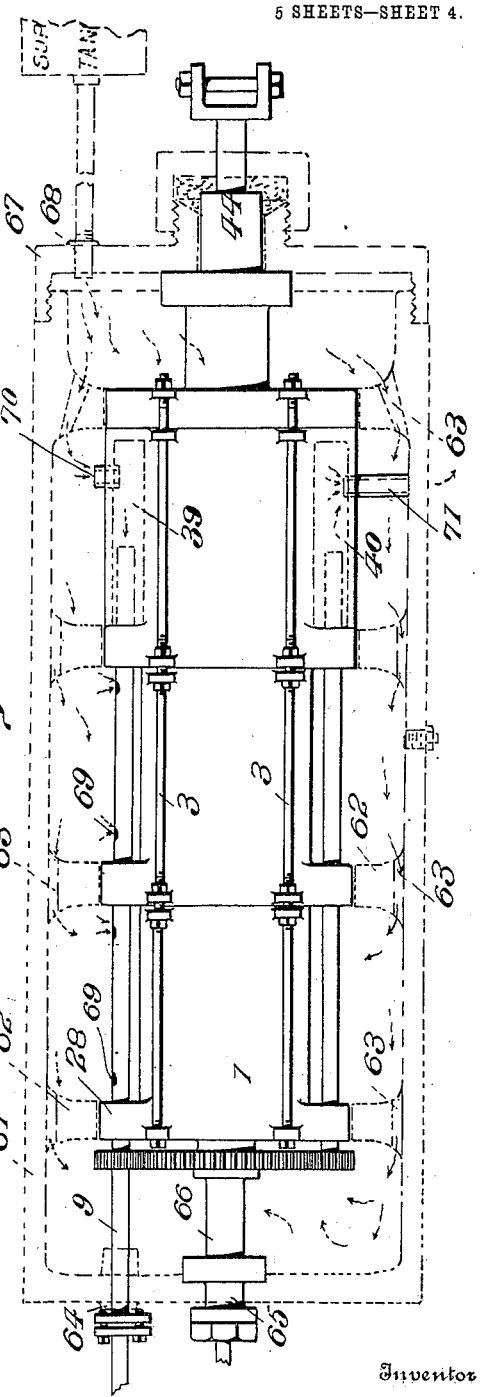
Witnesses
Gustave R. Thompson.
Frederick A. Holton.
Inventor
Lebbeus H. Rogers,
By
Mauro, Cameron, Lewis & Massie,
Attorneys.

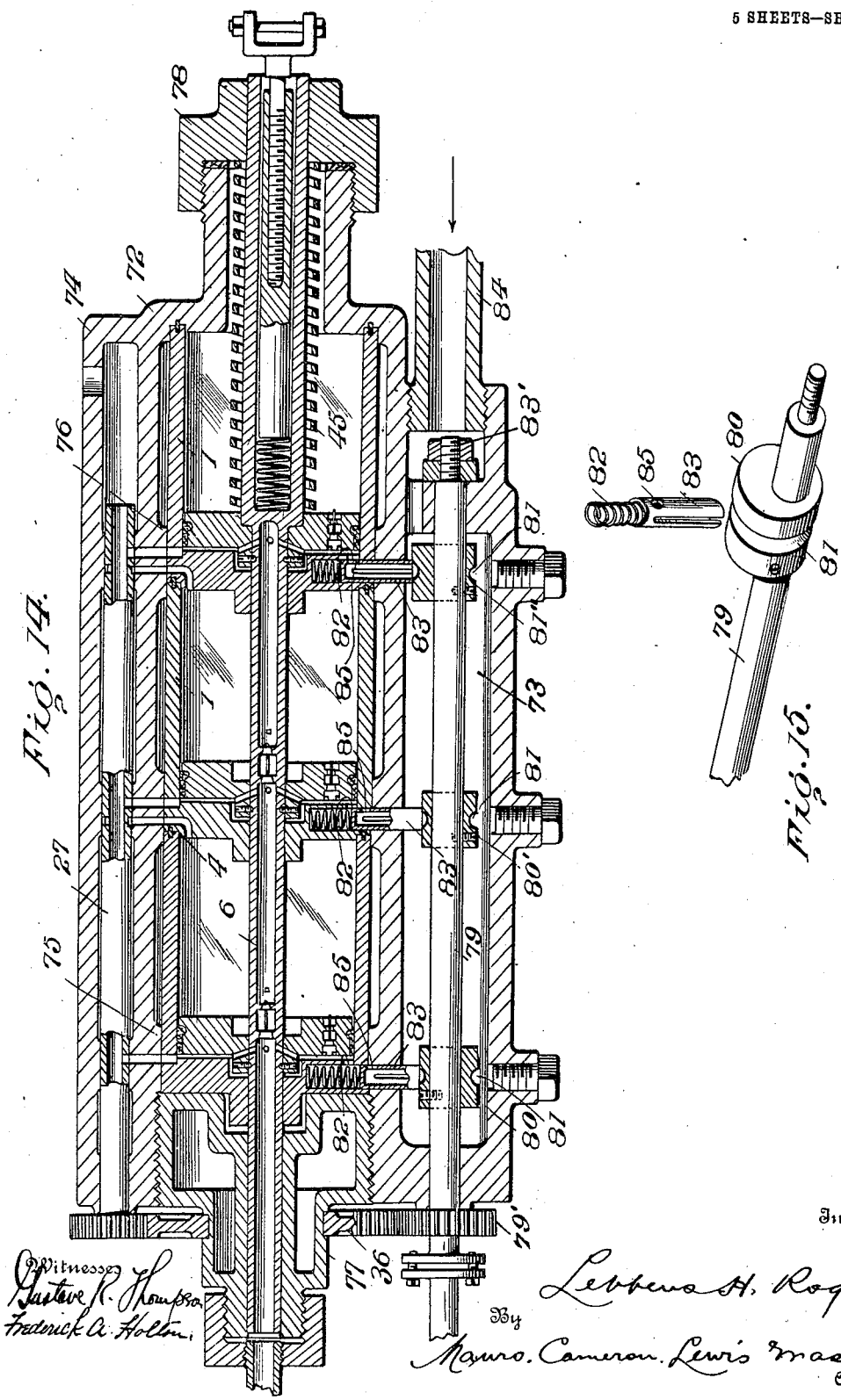

UNITED STATES PATENT OFFICE.

LEBBEUS H. ROGERS, OF NEW YORK, N. Y.

TANDEM BRAKE-CYLINDER.

No. 825,866.　　　　Specification of Letters Patent.　　　　Patented July 10, 1906.

Application filed June 29, 1905. Serial No. 267,659.

*To all whom it may concern:*

Be it known that I, LEBBEUS H. ROGERS, of New York, N. Y., have invented a new and useful Improvement in Tandem Brake-Cylinders, which invention is fully set forth in the following specification.

This invention relates to power-brakes, and especially to brake-cylinders, and has for its objects to provide a tandem brake-cylinder having a plurality of pistons whereby the element of safety may be increased by always having in reserve one or more pistons which may be placed in action in case of failure of any one to act.

A further object is to provide means for successively applying fluid-pressure to a series of pistons, thereby enabling the power to be graduated to the brakes and permitting the cars to be brought to a stop more gently, and thus avoiding strains or injury to the cars and jolting of the passengers.

Further objects are to combine the capability of graduating the power to the brakes with that of simultaneously applying reservoir-pressure to all the brakes, and also to provide a combined brake-cylinder and casing, which latter may also constitute a pressure-reservoir for the brake-cylinder, whereby less space will be taken up by the combined structure than by the power-brake systems now employed.

My invention further consists and resides in the construction and combination of coöperating elements, hereinafter to be more fully described and then set forth in the claims.

Certain mechanical expressions of the inventive idea involved are shown in the accompanying drawings, which are designed merely as illustrations to assist in the description of the invention and not as defining the limits thereof.

Figure 4:
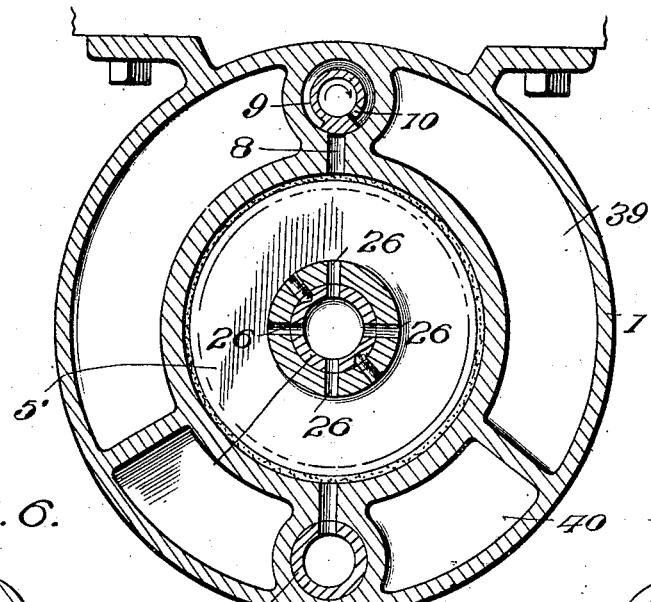
Figure 6:
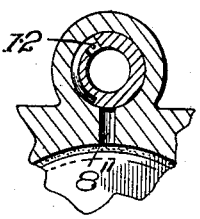
Figure 7:
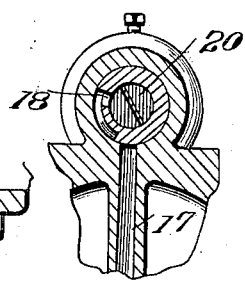
Figure 5:
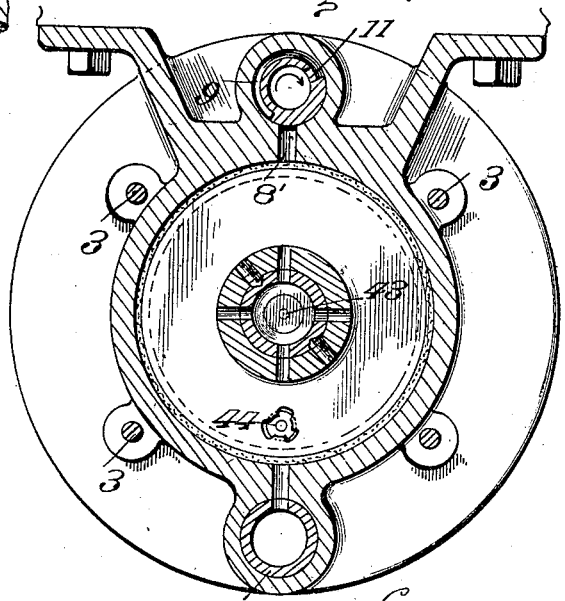

In said drawings, Figure 1 is a longitudinal sectional view of the tandem brake-cylinder, showing the several pistons in their respective chambers, together with the valve mechanism and other coöperating parts. Fig. 2 is a similar sectional view to that of Fig. 1, but fragmentary, showing the position of a piston in the cylinder at or near the end of its stroke and the corresponding position of one of the valve-shafts. Fig. 3 is an end elevation of the tandem brake-cylinder, showing the gearing for operating the valve-shafts. Figs. 4, 5, and 8 are transverse vertical sections taken on the lines 4 4, 5 5, and 8 8 of Fig. 1. Figs. 6 and 7 are sectional detail views showing the positions of the openings in the hollow valve-shaft at sections 6 6 and 7 7 of Fig. 1 when the brakes are off. Figs. 9 and 10 are perspective views of the hollow valve-shafts, the former reversed to better show the valve-openings. Fig. 11 is a perspective view of the hollow piston-rod, showing one of the pistons in place and also a push-rod terminating the piston-rod. Fig. 12 is a part plan and part sectional view showing a modification of the tandem brake-cylinder. Fig. 13 is a plan view of tandem brake-cylinder and pressure-reservoir inclosing the same. Fig. 14 is a horizontal sectional view of a tandem brake-cylinder provided with a casing and showing a modified construction of valves controlling admission of fluid to the brake-cylinder, and Fig. 15 is a detail.

Referring to Figs. 1, 2, 3, and 4, the tandem brake-cylinder is made up of a series of sections or compartments 1. Each of these sections is preferably cast with a solid end closure 2, which also constitutes the closure for the next section. To secure the sections together, clamping means, such as tie-rods 3, are employed, which pass through suitable lugs on each section and are provided with means, such as bolts, for securing the sections together. To secure a gas-tight fitting between the sections, the end of each section may engage a groove 4 in the bottom of the next section, and for further security a gasket 4' may be interposed. In each compartment of the brake-cylinder is a piston 5, provided with a circumferential packing and which is made fast to a hollow piston-rod 6, as by clamp-screws 7. For the purpose of introducing fluid under pressure successively to the face of each piston passages 8 8' 8'' are formed in the walls of each compartment and means provided for opening and closing them successively. In Fig. 9 one such means is illustrated and comprises a hollow valve-shaft 9, provided with a series of openings 10 to 12, spirally arranged in the shaft which as the shaft is turned successively register with the passages 8 in the walls of the compartments 1. For the purpose of imparting a rotation to the valve-shaft 9 any suitable actuating means which is under control of the motorman or brakeman may be employed, and for this purpose it is connected to the end of the shaft 9 by means of a coupling 13. The number of the openings in the shaft 9 will depend upon the number of pistons employed and also on the number of stages employed in applying pressure to the pistons. In order that open communication may be maintained between the source of pressure and the first or right-hand piston while the shaft 9 is being turned to its second position for applying pressure to the next succeeding piston, a groove 14 is cut either in the shaft or in the bearing-walls about the shaft and communicates with the opening 10. Similar grooves are provided for openings 11 and 12, but of less annular length, depending on the fractional part of the circumference through which the shaft is to be turned to open or close the passages.

In addition to the means above described for successively admitting fluid under pressure to the several compartments of the tandem brake-cylinder it is desirable at times to simultaneously admit fluid-pressure to all the pistons, and for this purpose means are provided which will admit fluid from the reservoir supplying pressure through passages 8 or from an independent reservoir. To this end the means shown in Figs. 1 and 2 will serve as an illustration. In the last compartment of the tandem brake-cylinder the piston is omitted and the compartment is made to serve as a pressure-reservoir 15. In the axis of this reservoir 15 is a tubular bearing 16, in which the end portion of the piston-rod 6 plays and which may communicate by passage 17 with hollow valve-shaft 9 through opening 18. In shaft 9 is a closure, such as a plug 19, and at a short distance in advance a second closure 20. Intermediate these closures are two openings 18 and 21 in the shaft 9, the former in the plane passing through passage 18 and the latter in a plane through passages 22 into reservoir 15. As indicated in Fig. 9, openings 18 and 21 are angularly displaced with reference to opening 12. In the bearing 23 is formed a groove which at all times communicates through opening 24 with the interior of the shaft 9 and also with reservoir 15. A turn-plug 25 permits opening or closing communication between reservoir 15 and the pressure-reservoir shown at the right hand of Fig. 1. With the parts as described the motorman or brakeman turns the valve-shaft through the successive positions to admit pressure to the several pistons, and if then it is desired to simultaneously apply additional reservoir-pressure to all the pistons the last turn of the shaft 9 brings the openings 18 and 21 into register with passages 17 and 22, thereby admitting fluid from reservoir 15 into the hollow piston-rod 6, from which it finds its way to the face of the pistons through passages 26 and there coöperates with the pressure previously admitted through passages 8.

In the movement of the pistons 5 to apply the brakes, it is necessary to provide means for exhausting the air in the rear of the pistons and to admit air on the reverse movement of the pistons. To effect this purpose, a hollow valve-shaft 27, Fig. 10, is supported in suitable bearings 28, similar to those supporting shaft 9. Openings 30, arranged in a straight line along the shaft, open into grooves 31, which in turn are made to register with passages 32, leading into the spaces in rear of the pistons 5. To take care of the fluid in the space in front of the piston-faces when the fluid-pressure is shut off from the pistons when the valve-shaft 9 is turned to a closed position, (indicated in Figs. 1 and 4,) openings 32 are provided in shaft 27, which are in alinement and which are arranged to simultaneously register with vent-passages 33, communicating with the spaces in front of the pistons 5. Means for synchronizing the movements of valve-shafts 9 and 27 are provided, such as by means of gears shown in Figs. 1 and 3. Fast to the ends of shafts 9 and 27 are small gears 34 and 35, which engage a large gear 36, loose on cap 37, which also serves the purpose of a closure for the tubular bearing 16. It will thus be evident that any movement that is imparted to valve-shaft 9 will be transmitted to valve-shaft 27, and from the illustrations, Figs. 1 to 7, it will be apparent that when pressure is cut off from compartments 1, communication is established with valve-shaft 27 during the return of the pistons from their extreme right-hand position to their left-hand position.

For the purpose of establishing communication between valve-shaft 9 and the pressure-reservoir I preferably surround the first compartment with a casing 38, which, with the walls of the compartment, forms a hollow chamber, which is preferably divided into two parts 39 and 40, the former for receiving fluid-pressure through conduit 41 and delivering it through valve-shaft 9 to the several compartments 1 and reservoir 15, and the latter, which is at all times in open communication with the atmosphere through 42, for receiving the exhaust from valve-shaft 27.

43 43' are reducing-valves located in the hollow piston-rod and intermediate the pistons and are designed to close when fluid under pressure enters the piston-rod from the right and to open when pressure is admitted on the left of the same. Valves of this description being common in the art, it is deemed unnecessary to further describe them. Valves 44 44' are placed in those pistons in rear of the first and serve to relieve the vacuum which would otherwise result when the pistons advance by admission of pressure to the forward piston or pistons only.

The power transmitted by the pistons to the piston-rod 6 acts on the brakes through an adjustable and resilient push-rod of improved construction and in the form illustrated comprises a tubular extension 6' of the piston-rod 6, around which is the usual piston-return spring 45. Freely movable within the hollow push-rod 44 is a rod 46, having its inner end cushioned, as by air or a spring 47, and having a screw-threaded recess sunk in its outer end for receiving a screw-threaded adjusting-rod 48, having a head 49, for connecting with a brake. (Not shown.) By screwing adjusting-rod 48 in or out the length of the stroke of the piston may be made to vary as desired. For properly confining spring 45 and supporting the push-rod a head 50 is secured to the end of the brake-cylinder. The space between the head 50 and piston 5 communicates with the outlet-chamber 40, through passage 51. Plugs 52 and 53 close passages for removing oil. The latter may also serve as a means for connecting reservoir 15 with a high-pressure or emergency reservoir in a manner hereinafter described.

The device thus far described operates as follows: Assuming the valve-shaft 9 connected by suitable power-transmitting means with the brake-operating device on the platform and the reservoir 38 connected with a source of fluid under pressure and the valve-shaft 9 turned to a closed position, the valve 25 being open, the pressure in reservoir 15 will be the same as that in the main reservoir. A slight turn of shaft 9 to the right will cause opening 10 to register with passage 8, leading to the face of the first piston at the right. At the same time valve-shaft 27 will turn to close passages 33, leading from the space in front of the pistons. As the fluid-pressure forces piston 5 forward valve 43 closes, valves 44 44' open, and the air confined in the compartments finds its exit through valves 44 44' to the face side of the remaining pistons. If more power is desired to be applied in the application of the brakes, the valve-shaft 9 is turned through an additional angle to bring opening 11 into registry with passage 8', thereby applying reservoir-pressure to the second piston and closing valve 43'. Valve 44 now remains closed while the pistons advance, and the air which has not already escaped in rear of the piston now finds its way out through passage 32, hollow valve 27, and chamber 40. A further advance of the valve-shaft 9 applies pressure to the third piston, and so on, depending on the number of pistons employed. To apply reservoir-pressure simultaneously to all the pistons when necessity arises to apply such pressure without delay, the valve-shaft is turned to its final position at once, thereby bringing openings 10, 11, and 12 rapidly into registry with their respective passages 8 8' 8'', but also causing openings 18 21 in shaft 9 to register with passages 17 and 22, thereby opening the reserve-pressure reservoir 15 to the hollow piston-rod 6. By reason of the construction of reducing-valves 43 43' this pressure is transmitted without delay the full length of the piston-rod and acts on all the pistons substantially at the same time. The position of the valve-openings is clearly shown in Fig. 2. It will be noted that by virtue of the supplemental reservoirs 15 and 38 a supply of fluid under pressure is maintained at close proximity to the place where the power is to be applied, and a quicker action is thereby secured. If it is desired to use reservoir 15 as a high-pressure emergency-reservoir, communication between reservoir 15 and the ordinary reservoir 38 is interrupted by means of valve 25 and reservoir 15 connected with a suitable source of high pressure. The last turn of the valve-shaft will then introduce a fluid under a higher pressure into hollow piston-rod 6, and thereby apply a high pressure to each of the pistons. To release the brakes, the valves are returned to their initial position, thereby shutting off fluid-pressure from the pistons and opening up communication between the spaces in front of the pistons and the atmosphere through passages 33 and hollow valve-shaft 27, whereupon spring 45 on the push-rod returns the pistons to their original position.

In Fig. 12 is illustrated means for directly applying fluid-pressure to the pistons through the hollow piston-rod independently of that applied successively through valve-shaft 9. In this construction the supplementary reservoir 15 of Fig. 1 may be omitted and the high-pressure reservoir connected through an engineer's valve of ordinary construction on the platform of the car to the end of the piston-rod 6; but a preferred way is to modify the cap 37, Fig. 1, and make it serve as a valve, as well as a cap, for the end of cylinder 1 and a bearing for the gear-wheel 36. To this end a chamber 54 is formed in the walls of the cap 37, provided with a connection 55 with the high-pressure reservoir (not shown) and through an opening 56 and passages 57, formed in the hub of gear-wheel 36 with the interior of hollow piston 6, through a slot 58. A suitable closure, such as a plug 59, is placed in the end of the piston-rod 6, and the latter is inclosed by a sleeve 60, extending from and forming a part of the valve-cap. By means of this construction when the valve-shaft 9 is turned through successive stages to let on pressure to the several pistons and it is desired to apply the emergency-pressure to all the pistons simultaneously the valve-shaft is given its final turn, whereby passage 57 in gear 36 registers with opening 56, thus opening up communication between chamber 54, the emergency or high-pressure reservoir, and the hollow piston-rod 6. The fluid thus acts upon the several pistons in the manner above described.

In Figs. 13 and 14 I have exemplified in two ways the application of a casing to surround or inclose the tandem brake-cylinder. Referring to Fig. 13. a casing 61 is provided with internal annular bearings 62, preferably cast integrally with the casing-walls and having openings 63, which permit communication through the whole length of the casing. Passages 64 and 65 are provided at the end of casing for the reception of the valve-shaft 9 and sleeve 66 for the hollow piston. Within the casing 61 is introduced the tandem brake-cylinder 1, with its shoulders 28 snugly fitting the bearings 62. A head 67, having an opening 68 for the introduction of fluid from a compressor or reservoir and another opening for receiving the end of the push-rod 44, is placed over the open end of the casing and made fast to the same and assists to force and hold together the several sections constituting the tandem brake-cylinder. There is thus formed about the brake-cylinder a fluid-pressure reservoir which is in open communication with the valve-shaft 9 through a plurality of openings 69. The chamber 39, which in Figs. 1 and 4 constitutes a reservoir, may be omitted or made to communicate with the space inclosed by the casing 61 through passage 70. The outlet-chamber 40, which receives the exhaust from the cyilnders 1, communicates with the atmosphere by means of a conduit 71. The operation of the valves and application of pressure to the pistons has already been described, except that the fluid under pressure now surrounds the brake-cylinders and tendency of escape of the compressed fluid through imperfect joints is overcome by the pressure surrounding the tandem brake-cylinder, which constitutes a decided advantage. The exhaust escapes through passage 71.

Fig. 14 illustrates another form of casing and also a modified construction of valve mechanism for controlling fluid under pressure to the several piston-compartments. 72 is the casing surrounding the tandem cylinders. 73 and 74 are receiving and outlet chambers for the pressure-reservoir fluid. 75 and 76 are internal flanges, annular in form, for snugly fitting the piston-cylinder. 77 is a screw-plug which holds the cylinders in place and which also forms a bearing for the cog-wheel 36 and piston-rod 6. The hollow piston-rod 6 may be closed at its outer end or may be provided with means for connecting it up with an independent source of pressure; but, as shown, it is provided with a packing-joint and may be connected with a train-pipe. 78 is a cap at the opposite end of the cylinder and serves to close the end of cylinder gas-tight and also serves as a bearing for the piston-return spring 45. Located within the receiving-chamber 73 is the valve-shaft 79, having on it cams 80, fast thereto, one of which is shown in detail in Fig. 15, having a circumferential groove 81. Each cam is placed opposite a passage which extends through the casing-wall of chamber 73 and into the solid end wall of the piston-cylinders and communicates with the space in front of the piston. One of these latter communicating openings is shown at 82. Spring-pressed hollow valve-stems 83 fit the above passages and engage the several cams over the grooves 81. The cam-shaft 79 is provided at its outer end with a gear-wheel 79' and is held in place by bolts 83'. Suitable reservoir connections 84 permit of the introduction of fluid under pressure to receiving-chamber 73. The cams 80 80' 80'' are so proportioned in relation to their respective valve-stems that cam 80'', for example, will open and maintain open communication between chamber 73 and the space in front of the first piston to the right during the turning of the valve-shaft 79 through all of its advance stages. Cam 80' will in like manner, on the second advance turn of the shaft 79, open and hold open its valve during subsequent advance stages of the valve-shaft. As each valve-stem 83 is pushed in by its cam fluid enters the valve-stem through groove 81 and finds its exit through passage 82 when opening 85 in the stem registers therewith. Both valve-shafts 79 and 27 are operated through the valve-gearing at the left of the cylinder in the manner shown and described in relation with Fig. 1.

From the foregoing it will be seen that the tandem brake-cylinder made in conformity with the principles of this invention permits power to be graduated to the brakes over a wide range of working conditions, thereby securing greater safety as well as gentleness of action, that by reason of locating the brake-cylinders within a casing, and especially within a reservoir-casing, the cylinders are maintained in alinement and leakage is guarded against, and that by reason of the special construction of the push-bar device greater adaptation is secured for the piston and resiliency secured in the bar.

What is claimed is—

1. In a power-brake, the combination of a brake-cylinder made up of a plurality of compartments, a casing surrounding said brake-cylinder, pistons in said compartments and means for introducing fluid under pressure from said casing into said compartments in succession.

2. In a power-brake, the combination of a brake-cylinder made up of a plurality of compartments, a casing surrounding said brake-cylinder and inclosing a space about the same constituting a pressure-reservoir, a hollow piston-rod extending through and opening into said compartments, and provided with pistons, one in each compartment, and fluid-pressure control means for admitting fluid from said reservoir to said compartments and hollow piston-rod in succession.

3. In a power-brake, the combination of a brake-cylinder made up of a plurality of compartments, a piston-rod extending through said compartments and having a plurality of pistons fast thereon, a tubular valve-shaft having openings therein for admitting fluid under pressure to said pistons in succession, an exhaust-control tubular valve-shaft, and means for simultaneously operating said valve-shafts.

4. In a power-brake, the combination of a brake-cylinder made up of a plurality of compartments, pistons therein, fluid-admission control means for each compartment, exhaust-control means for each compartment, and means simultaneously controlling both of said means.

5. In a power-brake, the combination of a brake-cylinder made up of a plurality of compartments, pistons therein, means admitting fluid to said compartments in succession, exhaust-control means for each compartment, and means simultaneously controlling both of said means.

6. In a power-brake, the combination of a brake-cylinder made up of a plurality of compartments, pistons therein, a hollow piston-rod fast to said pistons, and having openings leading into each compartment, a tubular valve-shaft having angularly-displaced openings for successively admitting fluid under pressure to said compartments and to said hollow piston-rod.

7. In a power-brake, the combination of a brake-cylinder made up of a plurality of compartments, pistons in said compartments, a pressure-reservoir inclosing said brake-cylinder, and fluid-pressure-control means for admitting fluid from said reservoir to said compartments successively.

8. In a power-brake, the combination of a brake-cylinder made up of a plurality of compartments, pistons in said compartments, a two-chambered casing surrounding said cylinder one of said chambers serving as a fluid-pressure reservoir and the other an exhaust-chamber, valve-controlled passages leading from said reservoir to said compartments and from said compartments to said exhaust-chamber.

9. In a power-brake, the combination of a brake-cylinder made up of a plurality of compartments, pistons in said compartments, a two-chambered casing surrounding said cylinder, one of said chambers serving as a fluid-pressure reservoir and the other as an exhaust-chamber, valve-controlled passages leading from said reservoir to said compartments and from said compartments to said exhaust-chamber, and means for successively opening the valves in the said reservoir-passages.

10. In a power-brake, the combination of a brake-cylinder made up of a plurality of compartments, pistons therein, a hollow piston-rod fast to said pistons, and having openings leading into said compartments, means controlling admission of fluid to said compartments, and a valve controlled by said means for admission of fluid to said hollow piston.

11. In a power-brake, the combination of a brake-cylinder made up of a plurality of compartments, pistons therein, a hollow piston-rod fast to said pistons, and having openings leading into each compartment, means controlling admission of fluid to said compartments and said hollow piston-rod, and reducing-valves in said rod closing on admission of fluid to said compartments and opening on admission of fluid to said hollow piston-rod.

12. In a power-brake, the combination of a brake-cylinder made up of a plurality of compartments, pistons therein, means for successively admitting fluid under pressure to said compartments, and pressure-equalizing valves in said pistons.

13. In a power-brake, the combination of a brake-cylinder made up of a plurality of compartments, pistons therein, means for successively admitting fluid under pressure to said compartments, pressure-equalizing valves in said pistons, and means returning said pistons to their initial position.

14. In a power-brake, a hollow push-rod, and an air-cushioned member therein provided with means for adjusting the length of said member.

15. In a power-brake, the combination of a brake-cylinder made up of a plurality of compartments, pistons therein, means for successively admitting fluid under pressure to said compartments, and means for simultaneously exhausting the same controlled by said first-named means.

16. In a power-brake, the combination of a brake-cylinder having a plurality of compartments provided with inlets and exhaust-outlets, pistons provided with equalizing-valves in said compartments, means for admitting fluid under pressure to said pistons in succession through said inlets, a tubular valve-shaft in open communication with the spaces in rear of the pistons and with the atmosphere, said valve-shaft having openings for registering with said exhaust-outlets on the return stroke of the pistons.

17. In a power-brake, the combination of a brake-cylinder having a plurality of compartments therein, pistons in said compartments, a low-pressure reservoir and a high-pressure reservoir, means successively introducing low-pressure fluid to said compartments from said first reservoir and for simultaneously introducing high-pressure fluid to said compartments from said second reservoir.

In testimony whereof I have signed this specification in the presence of two subscribing witnesses.

LEBBEUS H. ROGERS.

Witnesses:
H. D. ROGERS, Jr.,
A. P. ESPIE.